Aug. 6, 1935.  H. H. ROBINSON  2,010,323
TRAILER BODY CONSTRUCTION
Filed March 2, 1933
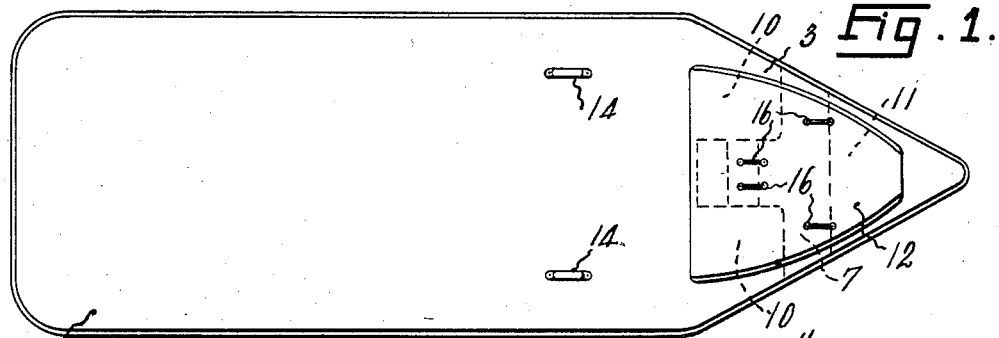
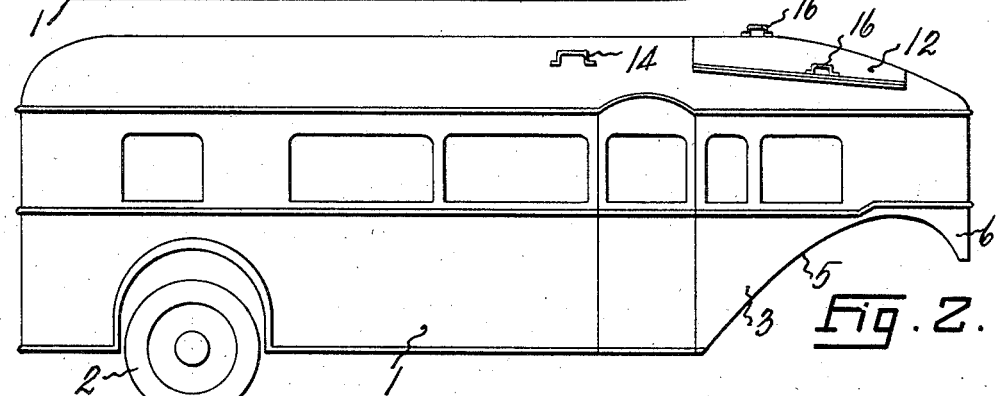
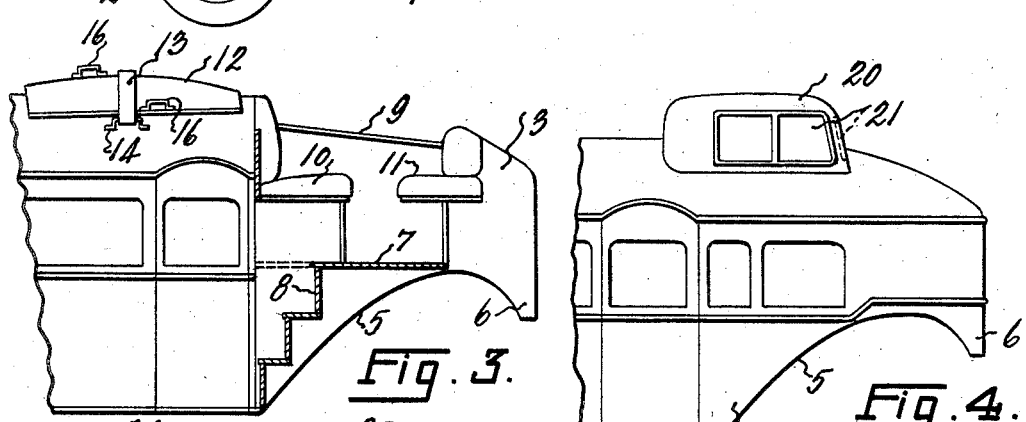
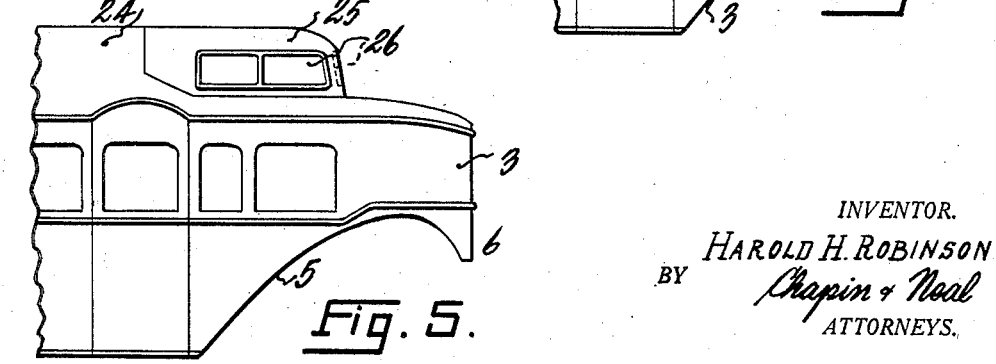
INVENTOR.
HAROLD H. ROBINSON
BY
ATTORNEYS.

Patented Aug. 6, 1935

2,010,323

UNITED STATES PATENT OFFICE 2,010,323

TRAILER BODY CONSTRUCTION

Harold H. Robinson, Opa Locka, Fla., assignor to Curtiss Aerocar Company, Inc., Opa Locka, Fla., a corporation of Florida Application March 2, 1933, Serial No. 659,367

1 Claim. (Cl. 296—1)

This invention relates to trailer body construction and more particularly to trailer bodies of the type having a generally pointed prow formation forming an elevated point of connection between the trailer and its towing vehicle.

Among the objects of the invention are to secure a more economical use of the space within the trailer, improved ventilation and improved visibility. Other and further objects will be apparent from the following specification and claim.

In the accompanying drawing which illustrates one embodiment of the invention,

Fig. 1 is a plan view of the trailer;

Fig. 2 is a side elevation of the trailer;

Fig. 3 is an elevation view of the forward part of the trailer with the near wall of the prow broken away to show the interior;

Fig. 4 is an elevational view of the forward part of the trailer showing a modified form; and Fig. 5 is a similar view showing a further modification.

Referring to the drawing, I designates the trailer generally which is provided at the rear with wheels 2 and at the forward end with a prow portion 3, the nose of which forms the point of connection with the tractor vehicle. Since this invention relates to the construction of the prow portion of the trailer the remainder of the trailer body will not be described in detail.

Trailers of this character are commonly provided with various seating arrangements for the accommodation of passengers or are fitted to provide living quarters for camping or traveling purposes. Trailers used for these purposes have been subject to the objections that the forward view from the trailer is almost completely obscured by the tractor vehicle and that proper ventilation is difficult due to the fact that the exhaust gases from the tractor as well as the dust and dirt kicked up by the tractor enter the windows of the trailer when ventilation is sought in that manner. By my invention both of these difficulties are overcome and in a manner to increase rather than decrease the usable space within the tractor.

As shown at 5 the floor of the prow portion 3 is curved upwardly to form an elevated point of attachment 6 for connection with a towing vehicle, not shown. At substantially the highest point of the curve 5 I construct a platform 7 extending across the prow portion from side to side and forming a deck substantially higher than the floor of the trailer proper. This deck is reached by means of a flight of narrow stairs 8 confined within the prow portion, that is the stairway does not extend into the full width portion of the trailer. As shown in dotted lines in Fig. 1 the stairway is positioned along the center line of the trailer. The roof of the trailer is cut away forming an opening 9 generally conforming in extent to the platform 7. Two forwardly looking seats 10 are provided on the platform 7, one on each side of the stairway, and if desired a third seat 11 looking to the rear may be positioned across the extreme forward part of the prow, otherwise this space may be utilized for an instrument board or the like. The opening 9 is provided with a removable hatch 12 which is adapted to close the opening 9 in a weather tight manner when desired. When the hatch is removed for occupancy of the seats 10 and 11 the hatch 12 may be strapped to the roof of the trailer rearwardly of opening 9, as shown in Fig. 3, by means of a strap 13 passed through suitable eyes 14 secured to the roof of the trailer. Handles 16 are provided on the hatch to facilitate its handling. The spaces at each side of the stairway beneath seats 10 are of sufficient size to be utilized for built-in fixtures or for storage.

It will be seen that the occupants of seats 10 and 11 are afforded an unobstructed view in all directions and are positioned above the zone of fumes from the exhaust of the tractor and of dust kicked up by the wheels of the tractor. Even when the deck is unoccupied the opening 9 may be left open affording an entrance for fresh air free of exhaust fumes and dust.

In Fig. 4 the opening 9 is shown covered with a permanent cab top 20 provided with front and side windows 21, these windows being arranged to open in any suitable manner to admit air for ventilation purposes. In the modification shown in Fig. 5 the roof 24 of the trailer has been raised slightly to make the roof of the cab 25 flush, or continuous with the roof of the trailer. This construction may be found preferable as the air entering the windows 26 may be made to take a substantially straight line course along the ceiling of the body of the trailer obviating drafts. This arrangement also affords greater stream line efficiency.

What I claim is:

In a passenger carrying trailer having its body closure progressively decreased in width at its forward end to form a prow, the side walls of the prow being smoothly continuous with the main rear portion of the body closure and having the under side of the prow portion curving upwardly to form an elevated nose for connection to a tractor vehicle, a platform accessible from the interior of the trailer only and positioned wholly within the prow portion of the trailer body at the level of the highest point of the upward curve of the under side of the prow, the roof of the trailer body closure being cut away over the platform intermediate the sides of the prow portion of the body closure to leave the latter unbroken and the air flow characteristics of the body unchanged below the edge of the roof opening, seats positioned on said platform within the confines of the roof opening to form a passenger carrying space and ventilating opening above the zone of exhaust gases and dust produced by the tractor.

HAROLD H. ROBINSON.